Figure 1:
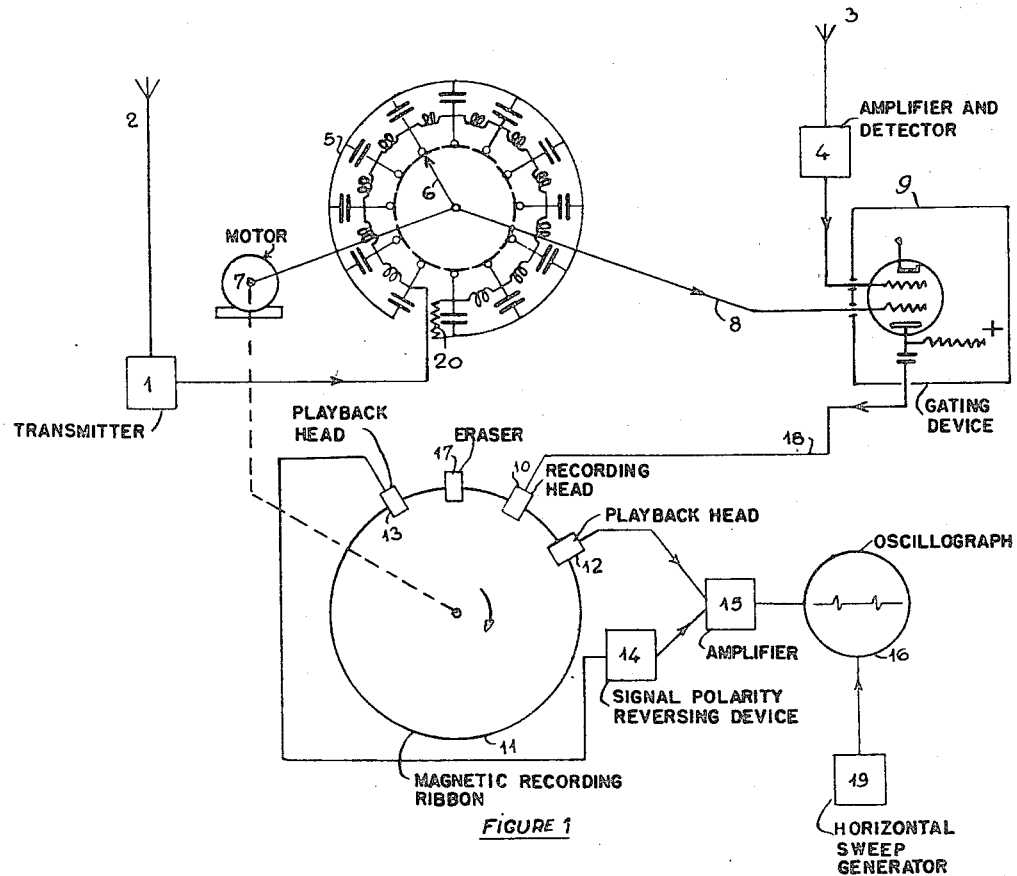

Aug. 28, 1951          P. GLOESS          2,566,189

RADIO DISTANCE AND MOVING TARGET INDICATOR

Filed July 15, 1947

INVENTOR:
PAUL GLOESS
By

Patented Aug. 28, 1951

2,566,189

UNITED STATES PATENT OFFICE 2,566,189

RADIO DISTANCE AND MOVING TARGET INDICATOR

Paul Gloess, Paris, France, assignor to Societe francaise Sadir-Carpentier, Paris, France, a corporation of France Application July 15, 1947, Serial No. 761,027
In France March 3, 1944

Section 1, Public Law 690, August 8, 1946
Patent expires March 3, 1964

7 Claims. (Cl. 343—9)

It is known that the more common method for the electro-magnetic detection of obstacles consists in sending out, at regular intervals, impulses of short duration which are reflected by the obstacles and return to the point of emission, after a predetermined lapse of time, the measure of this time furnishing immediately the distance separating the obstacle from the transmitter.

It is also known that the application of this method suffers from the presence of different fixed echoes arising from parasitic reflections of the impulse sent out by irregularities of ground, more or less distant metallic masses, etc.

These fixed echoes completely conceal the useful echoes due to the presence of the obstacle, which thus renders the method inapplicable and, even in less unfavourable conditions, these echoes render the application of the method delicate and uncertain, due to risks of confusion between the parasitic and useful echoes.

The present invention has for its object the separation of the fixed echoes in the case where the obstacle of which one wishes to determine the distance is a movable object the distance of which from the transmitter varies as a function of time.

The method consists essentially in opposing the return signals received at a given instant to those received some time before.

In this manner the fixed echoes not varying, either as to position, or as to amplitude, during the lapse of time are cancelled by compensation whilst the echoes due to the movable object, because of the fact that the position of the latter has varied in the meantime, are not cancelled. There are thus observed on the screen of the oscillograph two echoes separated from one another with the exclusion of all other echoes, and the examination of these two useful echoes gives all useful information concerning the position of the movable object.

This principle of compensation can only be applied with great care because it is necessary to compare the signals on their return at moments sufficiently distant one from the other in order that the distance of the movable object may have sufficiently varied in the meantime.

Thus recordings should be made that may be produced without difficulty after a lapse of time of about, for example, a second, which excludes practically any kind of electronic recording or of recording on a fluorescent screen.

According to my invention, use is made preferably of a recording on magnetic wire which allows through simple obliteration, making use indefinitely of the same steel wire or ribbon.

But now it is impossible to record directly on the wire the signals on their return. This would lead, in effect, amongst other difficulties to an impossible speed of unwinding for the steel wire.

The present invention disposes of this inconvenience by employing a stroboscopic method, i. e. a kind of frequency change of the returning signals, so that their duration is apparently multiplied by a high number, (in the example below the multiplication factor is 500), the wave shape of the signals received however being preserved.

According to my invention a radio-pulse-echo system for determining the distance of moving objects in the presence of masking pulse-echoes produced by stationary objects consists in that pulse-echoes from fixed objects received at a given instant are applied to a comparing device so that such pulse-echoes cancel each other whereas pulse-echoes from moving objects by reason of the time shift affecting them are not cancelled, a "stroboscopic" device reducing the frequency of the received reflected pulses so as to expand the time co-ordinate of the pulse.

Figure 2:
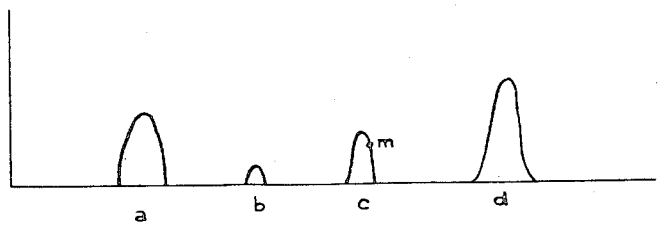

The invention will be described with further detail by reference to the attached drawings, in which Fig. 1 is a diagrammatic showing of a preferred embodiment of this invention; and Fig. 2 is a graph employed for the purpose of facilitating the explanation of the operation of this invention.

The transmitter 1 sends to the aerial 2 impulses of short duration of which it is desired to observe the different reflections; the latter are received by the receiver aerial 3, amplified and detected at 4. The apparatuses 1, 2, 3, 4 are well known per se and do not thus require further explanation.

To effect the expansion of the axis of time of the received signals, use is made of a time-lag network 5 comprising for instance $n$ sections, preferably identical, terminating at $n$ points in front of which moves a rotary wiper 6 controlled by a motor 7 turning at a uniform speed. The time-lag network receives through one of its extremities impulses transmitted by 1 through the aerial 2, these impulses propagating in the same sense as the direction of the wiper 6.

To avoid all parasitic reflection, the delaying line 5 terminates by a resistance 20 equal to its characteristic resistance.

The total duration of travel of the impulse sent by 1 through the network 5 is precisely equal to the interval separating the emission by 1 of two successive impulses. The wiper 6 is connected by the conductor 8 to the apparatus 9 adapted to transmit the signal received by 4 to the line 18 during the period of the impulse transmitted by 8 and only during this period. This apparatus 9 can be very simply formed by a vacuum tube including the wire 18 in its anode circuit. The line coming from 4 is connected to the control grid of the tube and the conductor 8 to an auxiliary grid biased in such a manner that the tube is locked except during the period during which the impulses are applied through 8.

The wire 18 feeds a recording head 10 on the magnetic ribbon 11 driven at a speed appreciably less than the speed of rotation of the wiper 6.

The endless ribbon 11, has preferably a circular shape and it is preferably caused to progress by the motor 7 through a suitable reducing gear.

The operation of the parts 5 to 9 is as follows:

In Figure 2, the curve gives the reflecting signals at successive instants. Its total duration is obviously equal to that separating two consecutive impulses transmitted from 1. This curve is composed for example of different parasitic echoes such as $a$, $b$, $c$ and a useful echo such as $d$.

When the wiper 6 is on the number $k$ point of the time-lag network the apparatus 9 is released for the period of an impulse transmitted by 1 which period begins at a moment corresponding to $$\frac{k}{n}$$

times the time of separating of two successive impulses.

Thus the wire 18 transmits at this moment the ordinate of the curve of Figure 2 corresponding to the said moment; for example, it is the ordinate of the point $m$ that is transferred to the head 10; then the wiper passing over the following point, the adjacent point of the curve is analysed and recorded on the magnetic wire by the head 10. The analysis is thus more accurate when the number of points, that is of sections of time-lag network 5, is increased.

Experience shows that when using a hundred sections the curve of Figure 2 is reproduced with a sufficient accuracy for practical requirements.

The result is the same as if the wire 18 were to transmit a signal of a shape identical to the original signal but with a total period multiplied by a high factor since this period is equal to that of the rotation of the wiper 6.

If, for example, the impulses are transmitted by 1 5,000 times per second and if the wiper effects ten rotations per second, the factor of expansion is $$\frac{5{,}000}{10}=500$$

These relatively slow signals can easily be recorded on the ribbon 11. Compensation is effected very easily. To this purpose a first recording head 12 placed preferably just after 10, receives the signals to be recorded and transmits them to the amplifier 15. A second head 13 shifted with respect to 12, through the major fraction of a turn of the ribbon 11 receives the signals which have been recorded a predetermined time beforehand, i. e. a time equal to that taken by the ribbon for advancing from the head 12 to the head 13.

The signals received by 13 have their polarity reversed by the apparatus 14 and are added to those from 12 in the amplifier 15 which feeds the vertical deflection system of the oscillograph the scale of which is shown at 16. The recording apparatus is completed by an obliterating head 17. The generator 19, suitably synchronized with the transmitter 1, feeds the horizontal deflection system as in the usual detecting apparatus at a frequency corresponding to the speed of rotation of the switch 6.

It is thus seen that finally the fixed echoes are eliminated by compensation in 15 and that there appear on the screen only two useful echoes both produced by the moving object and shifted one with respect to the other, one being received by the head 12, the other by the head 13. The distance separating these two signals on the oscillograph is due to the influence of the radial speed of the moving object during the known time taken by the ribbon to pass from the head 12 to the head 13. As a consequence the measure of this interval and of the distance of the first echo to the zero of the oscillograph indicates the position of the moving object, and also its radial speed. To arrive at this result the speed of the ribbon 11 is obviously selected so that the commencement of the recording arriving at 12 may coincide with the commencement of the recording arriving at 13 in order to obtain the desired compensation.

The speed of rotation of the wiper 6 is sufficiently large so that while the wiper makes a turn corresponding to the recording of an amplified signal by the head 10, the useful echo reflected by the moving object has undergone no noticeable displacement.

In an example of construction, I use impulses transmitted by 1 having a duration of two microseconds repeated 5,000 times per second in such a manner that the total duration of the signal received by 4 is 200 micro-seconds, a period equal to the lag introduced by the line 5; the wiper 6 executes ten turns per second and the spacing between 12 and 13 corresponds to $\frac{9}{10}$ of a second, the ribbon 11 making one turn per second. The time-lag line has 5 to 100 identical sections.

The different apparatuses used are well-known per se to those conversant with the art, when considered separately, it is thus unnecessary to describe them in greater detail.

Modifications can obviously be introduced in the construction described without departing from the spirit of the present invention and it is not intended to limit this invention to the exact details described except in so far as those details are defined in the claims.

What I claim is:

1. An arrangement for defining the distance of a moving object while eliminating the effects of any stationary objects comprising a generator of pulses, an aerial adapted to transmit said pulses, a time lag circuit fed with pulses by said generator, said pulses progressing through said time lag circuit during the time separating said pulses, the time constant of said time lag circuit being such that a pulse applied by said generator at one end thereof requires a time interval separating two pulses to traverse said circuit, means for receiving pulses from different parts of said time lag circuit at a frequency which is a submultiple of the periodicity of said pulses, a receiver for the echoes of the pulses transmitted by said generator and reflected by a moving object and by stationary objects, connections between said last mentioned means and said receiver whereby said last mentioned means applies gating pulses to said echo receiver from said time lag circuit for allowing the passage in said receiver of the echoes and a storage device coupled to said receiver for storing the echoes received at two moments separated by a large interval of time compared to the time interval between said pulses and means for comparing the echoes stored at said last mentioned moments.

2. An arrangement for defining the distance of a moving object while eliminating the action of any stationary objects comprising a generator of pulses, an aerial adapted to transmit said pulses, a time lag circuit fed with pulses by said generator, said pulses progressing through said time lag circuit during the time separating said pulses, said time lag circuit including a plurality of taps substantially equally spaced in time connected thereto, the time constant of said time lag circuit being such that a pulse applied by said generator at one end thereof requires a time interval separating two pulses to traverse said circuit, a wiper arm adapted to move over said taps of said circuit at a frequency which is a submultiple of the periodicity of said pulses, a receiver for the echoes of the pulses transmitted by said generator and reflected by the moving object and by the stationary objects, connections between said wiper arm and said receiver whereby said wiper arm applies gating pulses to said echo receiver from said time lag circuit for allowing the passage in said receiver of the echoes, and a storage device coupled with said receiver for storing the echoes received at two moments separated by a large interval of time compared to the time interval between said pulses and means for comparing the echoes stored at said last mentioned moments.

3. An arrangement for defining the distance of a moving object while eliminating the action of any stationary objects comprising a generator of pulses, an aerial adapted to transmit said pulses, a time lag circuit fed with pulses by said generator, said pulses progressing through said time lag circuit during the time separating said pulses, said time lag circuit including a plurality of taps substantially equally spaced in time connected thereto, the time constant of said time lag circuit being such that a pulse applied by said generator at one end thereof requires a time interval separating two pulses to traverse said circuit, a wiper arm adapted to move over said taps of said circuit at a frequency which is a submultiple of the periodicity of said pulses, a receiver for the echoes of the pulses transmitted by said generator and reflected by the moving object and by the stationary objects, connections between said wiper arm and said receiver whereby said wiper arm applies gating pulses to said echo receiver from said time lag circuit for allowing the passage in said receiver of the echoes and including a vacuum tube with at least two grids and an anode, means for applying the gating pulses to one of the grids to render the vacuum tube conductive for the received echoes applied to said other grid and a storage device coupled with the anode of said vacuum tube for storing the echoes received at two moments separated by a large interval of time compared to the time interval between said pulses and means for comparing the echoes stored at said last mentioned moments.

4. A system for defining through radio pulse echoes the distance of a moving object in the presence of masking pulse echoes produced by stationary objects, comprising a high frequency transmitter for transmitting very short pulses at a predetermined pulse repetition frequency, a receiver for receiving echo signals produced both by a moving object and by stationary objects, means connected to said transmitter for applying gate pulses to said receiver at a predetermined frequency lower than said pulse repetition frequency to render said receiver responsive to the received echo signals, a storage device coupled to said receiver for storing the echo signals received at two moments separated by a large interval of time compared to the time interval between said first mentioned pulses, said storage device including a signal recording device having a signal recording element and a signal recording head connected to said receiver, a pair of reproducing heads for said recording device, means for moving said signal recording element past said recording and said reproducing heads at a speed such that the echo signals recorded on said recording element by said recording head are individually reproduced by said pair of reproducing heads at time intervals well spread apart compared to the time interval between said first mentioned pulses and a circuit to which the outputs of said pair of reproducing heads are applied in phase opposition to cancel the effect of the echo signals due to stationary objects.

5. A system for defining through radio pulse echoes the distance of a moving object in the presence of masking pulse echoes produced by stationary objects, comprising a high frequency transmitter for transmitting very short pulses at a predetermined pulse repetition frequency, a receiver for receiving echo signals produced both by a moving object and by stationary objects, a gating device for said receiver, means connected to said transmitter for applying gate pulses to said gating device at a predetermined frequency lower than said pulse repetition frequency to render said receiver responsive to the received echo signals, a storage device coupled to said receiver for storing the echo signals received at two moments separated by a large interval of time compared to the time interval between said first mentioned pulses, said storage device including a signal recording device having a signal recording element and a signal recording head connected to said receiver, a pair of reproducing heads for said recording device, means for moving said signal recording element past said recording and said reproducing heads at a speed such that the echo signals recorded on said recording element by said recording head are individually reproduced by said pair of reproducing heads at time intervals well spread apart compared to the time interval between said first mentioned pulses and a circuit to which the outputs of said pair of reproducing heads are applied in phase opposition to cancel the effect of the echo signals due to stationary objects.

6. A system for defining through radio pulse echoes the distance of a moving object in the presence of masking pulse echoes produced by stationary objects, comprising a high frequency transmitter for transmitting very short pulses at a predetermined pulse repetition frequency, a receiver for receiving echo signals produced both by a moving object and by stationary objects, a vacuum tube gating device connected to said receiver, said vacuum tube having a control grid, means for applying gating pulses to said control grid at a predetermined frequency lower than said pulse repetition frequency to render said receiver responsive to the received echo signals, a storage device coupled to said receiver for storing the echo signals received at two moments separated by a large interval of time compared to the time interval between said first mentioned pulses, said storage device including a signal recording device having a signal recording element and a signal recording head connected to said receiver, a pair of reproducing heads for said recording device, means for moving said signal recording element past said recording and said reproducing heads at a speed such that the echo signals recorded on said recording element by said recording head are individually reproduced by said pair of reproducing heads at time intervals well spread apart compared to the time interval between said first mentioned pulses and a circuit to which the outputs of said pair of reproducing heads are applied in phase opposition to cancel the effect of the echo signals due to stationary objects.

7. A system for defining through radio pulse echoes the distance of a moving object in the presence of masking pulse echoes produced by stationary objects, comprising a high frequency transmitter for transmitting very short pulses at a predetermined pulse repetition frequency, a receiver for receiving echo signals produced both by a moving object and by stationary objects, a vacuum tube gating device connected to said receiver, said vacuum tube having a control grid, means connected to said transmitter for applying gating pulses to said control grid at a predetermined frequency lower than said pulse repetition frequency to render said receiver responsive to the received echo signals, a storage device coupled to said receiver for storing the echo signals received at two moments separated by a large interval of time compared to the time interval between said first mentioned pulses, said storage device including a signal recording device having a signal recording element and a signal recording head connected to said receiver, a pair of reproducing heads for said recording device, means for moving said signal recording element past said recording and said reproducing heads at a speed such that the echo signals recorded on said recording element by said recording head are individually reproduced by said pair of reproducing heads at time intervals well spread apart compared to the time interval between said first mentioned pulses and a circuit to which the outputs of said pair of reproducing heads are applied in phase opposition to cancel the effect of the echo signals due to stationary objects.

PAUL GLOESS.

REFERENCES CITED

The following references are of record in the file of this patent:

UNITED STATES PATENTS

| Number | Name | Date |
|---|---|---|
| 2,407,198 | Wolff | Sept. 3, 1946 |
| 2,410,424 | Brown | Nov. 5, 1946 |
| 2,422,133 | Sanders | June 10, 1947 |
| 2,422,135 | Sanders | June 10, 1947 |
| 2,491,450 | Holmes | Dec. 13, 1949 |
| 2,534,820 | Hurvitz | Dec. 19, 1950 |